United States Patent
Shiwaku (10) Patent No.: US 9,704,091 B2
(45) Date of Patent: Jul. 11, 2017

(54) WIRELESS TAG UNITS (71) Applicant: iSMART Solutions Inc., Mitaka (JP)

(72) Inventor: Noboru Shiwaku, Mitaka (JP)

(73) Assignee: iSmart Solutions Inc., Mitaka (JP)

( * ) Notice: Subject to any disclaimer, the term of this patent is extended or adjusted under 35 U.S.C. 154(b) by 0 days.

(21) Appl. No.: 15/092,268

(22) Filed: Apr. 6, 2016

(65) Prior Publication Data

US 2016/0300133 A1    Oct. 13, 2016

(30) Foreign Application Priority Data

Apr. 10, 2015  (JP) .................................. 2015-92271

(51) Int. Cl.
| | | |
|---|---|---|
| *G06K 19/07* | (2006.01) | |
| *H01Q 1/22* | (2006.01) | |
| *H04B 5/00* | (2006.01) | |
| *G06K 19/077* | (2006.01) | |

(52) U.S. Cl.
CPC . *G06K 19/07771* (2013.01); *G06K 19/07749* (2013.01); *G06K 19/07762* (2013.01); *G06K 19/07773* (2013.01); *G06K 19/07786* (2013.01); *H01Q 1/22* (2013.01); *H01Q 1/2283* (2013.01); *H04B 5/0081* (2013.01)

(58) Field of Classification Search
CPC ....... G06K 19/07771; G06K 19/07762; G06K 19/07773; G06K 19/07749; G06K 19/07786; H01Q 1/22; H01Q 1/2283; H04B 5/0081

See application file for complete search history.

(56) References Cited

U.S. PATENT DOCUMENTS

| | | | | |
|---|---|---|---|---|
| 7,298,343 | B2* | 11/2007 | Forster | G06K 19/07749 343/700 MS |
| 7,505,000 | B2* | 3/2009 | Hockey | G06K 19/07749 343/700 MS |
| 2001/0012682 | A1* | 8/2001 | Kayanakis | G06K 19/07749 438/585 |
| 2001/0014377 | A1* | 8/2001 | Babb | B60C 23/0493 428/40.1 |

(Continued)

FOREIGN PATENT DOCUMENTS

| | | |
|---|---|---|
| JP | 2000-332523 A | 11/2000 |
| JP | 2007-243296 A | 9/2007 |
| JP | 2010-231582 A | 10/2010 |

*Primary Examiner* — Daniel Walsh
(74) *Attorney, Agent, or Firm* — Baba Patent Agency (57) ABSTRACT

A wireless tag unit containing an antenna connected to a semiconductor element including communication and memory functions, a dielectric layer and a metal layer structured to be opposed with the antenna via the dielectric layer, the wireless tag unit having: a first conductive element electro-magnetically coupled with a metal surface of the metal layer; and a second conductive element electro-magnetically coupled with the first conductive element, the second conductive element being structured to be branched from the first conductive element; wherein a part of the second conductive element is structured above the antenna so as to keep a predetermined distance from the first conductive element, an open structure being provided with said a part of the second conductive element not to fully shield an area above the antenna.

4 Claims, 5 Drawing Sheets

(56) References Cited

U.S. PATENT DOCUMENTS

| | | | |
|---|---|---|---|
| 2002/0060903 A1* | 5/2002 | Kano | G06K 19/07722 361/727 |
| 2002/0075186 A1* | 6/2002 | Hamada | H01Q 1/22 343/700 MS |
| 2003/0116634 A1* | 6/2003 | Tanaka | G06K 19/0716 235/492 |
| 2003/0169207 A1* | 9/2003 | Beigel | G06K 19/07762 343/718 |
| 2005/0012616 A1* | 1/2005 | Forster | G06K 19/0717 340/572.7 |
| 2005/0093677 A1* | 5/2005 | Forster | G06K 19/07749 340/10.1 |
| 2006/0232418 A1* | 10/2006 | Baba | G06K 19/07749 340/572.7 |
| 2007/0080360 A1* | 4/2007 | Mirsky | H01L 23/3677 257/99 |
| 2008/0122704 A1* | 5/2008 | King | H01Q 9/16 343/702 |
| 2009/0045964 A1* | 2/2009 | Takeda | G06K 19/07749 340/572.9 |
| 2010/0127085 A1* | 5/2010 | Yamagajo | G06K 19/07749 235/492 |
| 2010/0181379 A1* | 7/2010 | Okegawa | G06K 19/07749 235/488 |
| 2010/0230498 A1* | 9/2010 | Atherton | G06K 7/10178 235/492 |
| 2010/0302910 A1* | 12/2010 | Howell | A43B 3/0005 368/10 |
| 2011/0031320 A1* | 2/2011 | Kato | G06K 19/07749 235/492 |
| 2011/0114735 A1* | 5/2011 | Ziai | G06K 19/07786 235/492 |
| 2011/0121947 A1* | 5/2011 | Kubota | B32B 5/28 340/10.1 |
| 2011/0134622 A1* | 6/2011 | Yu | H01Q 1/22 361/814 |
| 2011/0140977 A1* | 6/2011 | Yang | H01Q 1/2216 343/725 |
| 2011/0147467 A1* | 6/2011 | Choi | G06K 19/07327 235/492 |
| 2011/0253793 A1* | 10/2011 | King | G06K 19/07728 235/492 |
| 2012/0111950 A1* | 5/2012 | Worrall | G06K 19/07762 235/488 |
| 2012/0176282 A1* | 7/2012 | Kato | G06K 19/07749 343/702 |
| 2012/0235870 A1* | 9/2012 | Forster | H01Q 7/00 343/728 |
| 2013/0291375 A1* | 11/2013 | Virtanen | B23K 26/38 29/601 |
| 2014/0070010 A1* | 3/2014 | Diorio | G06K 19/07773 235/492 |
| 2014/0198006 A1* | 7/2014 | Nakano | G06K 19/07794 343/788 |
| 2015/0108221 A1* | 4/2015 | Akamatsu | H01Q 1/38 235/488 |
| 2015/0108222 A1* | 4/2015 | Shimizu | H01Q 1/38 235/488 |
| 2015/0144702 A1* | 5/2015 | Mei | G06K 19/0775 235/488 |
| 2015/0269477 A1* | 9/2015 | Finn | G06K 19/07794 235/492 |
| 2016/0300133 A1* | 10/2016 | Shiwaku | G06K 19/07771 |

* cited by examiner

WIRELESS TAG UNITS

This application claims priority from Japanese Patent Application No. 2015-92271 filed on Apr. 10, 2015, which is incorporated hereinto by reference.

TECHNICAL FIELD

The present invention relates to passive wireless tag units having no-battery, which is used of RFID (Radio Frequency Identification).

BACKGROUND OF THE INVENTION

In recent years, wearable computing devices have attracted a great deal of attention for its convenience. Wearable computing devices give users convenience using wearable terminals, networks and cloud computing systems. Accordingly, there is a demand for providing small sized wearable devices and networks which can be used at anytime and anywhere by the user.

An active wireless tag system which uses batteries for supplying power to the wireless tag system which has advantages in read-range performances and communication stabilities. However, active wireless tag systems have drawbacks, such as, complicated system configurations and necessities to change batteries because batteries are required to operate the wireless tag systems. Further, size of the active wireless tag system becomes bigger. Accordingly, the active wireless tag system is not suitable for wearable terminals.

On the other hand, passive wireless tag systems are convenient for wearable terminals due to their simple system configurations and no-battery operations. However, the passive wireless tag system needs power conversion systems therein to supply power for semiconductor devices having communication and data processing functions. This power conversion is performed by receiving radio wave frequency of UHF band, and micro wave band from a reader/writer for the wireless tag system as a power source.

As a result, under a certain usage environment, when power conversion is not adequately performed, read-range and communication performances of the wireless tag become unstable due to insufficient power conversion caused by and radio wave absorption. Particularly, when the wireless tag system is used as a wearable terminal attached with the human body, UHF band radio wave is absorbed by the human body, because water occupies 60% of the human body. As a result, the power conversion is not fully performed to supply necessary power to the semiconductors inside the wireless tag. Under this environment, the read-range characteristics and communication capabilities of the wireless tag attached to human body become unstable. There are necessities to solve these problems of instability in read-range characteristics and communication capabilities associated with wearable devices caused by insufficient power conversion due to the radio wave absorption.

In the case of an arm-wearable terminal, such as an arm-wristband, the size of the arm wearable terminal needs to be miniaturized. Further, an antenna system installed in the arm wearable terminal needs to efficiently receive radio waves in UHF and Micro-wave bands with high sensitivity. Also the antenna system needs to be less expensive. Further, the wide directivity wearable terminal is needed to effectively receive the radio wave from one direction of a reader/writer.

Japanese Patent Application Publication No. 2010-231582 discloses a wireless tag having good high-frequency transfer characteristics and transfer characteristics under the environment where temperature changes. In FIG. 1 of Japanese Patent Application Publication No. 2010-231582 discloses a wireless tag which is structured by a dielectric layer P, on both side of which, prepreg layers are disposed, wherein a conductive material layer is provided on one side of the laminated body and a metal foil layer on the other side of the laminated body.

Japanese Patent Application Publication Number 2000-33523 discloses a wireless tag configured by an antenna, a ground conductive body, a half-wave length resonator configured by a micro-strip line having a dielectric body disposed between the antenna and the ground conductive body, one or a plurality of line-shaped conductor bodies being connected with a center point of the antenna and an IC (Integrated Circuit) disposed between the antenna and the ground conductive body.

The wireless tag disclosed in Japanese Patent Application Publication Numbers 2010-231582 and 2000-33523 can be used under environment including conductive materials. However, the wireless tag has some issues, such as poor performances in read-range characteristics (low sensitivity due to the high density configuration) and poor performances in antenna directivity performances required by the small sized wearable terminals. Further, the wireless tag has some other issues on antenna system to efficiently receive radio waves in UHF band and micro wave band to satisfy required performances when the wireless tag needs to be minimized

OBJECTIVES

An object of the present invention is to provide a small sized wireless tag unit used of wearable terminals regardless of the environment including conductive materials and non-conductive materials.

Another object of the present invention is to provide a small sized wireless tag unit having generic wide read range performances and a practical readable distance between the wearable terminal and a reader/writer of the wireless tag unit.

Another object of the present invention is to provide a small sized wireless tag unit having a wide-range antenna directivity in UHF band and micro wave bands used of wide directional wearable terminals.

Another objet of the present invention is to provide a wireless tag unit which is configured by a main unit and a sub unit which improves the flexibility required from various market needs by having capability for replacing the sub unit onto which a custom designed print can be placed.

Another object of the present invention is to provide a wireless tag unit having capabilities for programming for customizing the read range performance of the wearable terminal. Based on this feature, it becomes possible to produce wearable terminals according to each read range characteristic for mass production of wearable terminals.

SUMMARY OF THE INVENTION

The forgoing object of the present invention is accomplished by a first embodiment of a wireless tag unit containing an antenna connected to a semiconductor element including communication and memory functions, a dielectric layer and a metal layer structured to be opposed with the antenna via the dielectric layer, the wireless tag unit having:

a first conductive element electro-magnetically coupled with a metal surface of the metal layer; and a second conductive element electro-magnetically coupled with the first conductive layer, the second conductive element being structured to be branched from the first conductive element, wherein a part of the second conductive element is structured above the antenna so as to keep a predetermined distance from the first conductive element, an open structure being provided with said a part of the second conductive element not to fully shield an area above the antenna.

The foregoing object is also accomplished by a second embodiment of the wireless tag unit of the first embodiment, wherein the second conductive element is structured by a plurality of conductive parts, each of the conductive parts being electro-magnetically coupled with and branched from the first conductive material, and wherein each of the conductive parts is substantially symmetrically installed on a substantially center of the semiconductor element connected to the antenna.

The foregoing object is also accomplished by a third embodiment of the wireless tag unit of the first embodiment or the second embodiment wherein both edges of the first conductive element are extended in a coupling direction with the second conductive element so that the extended portion is set at a predetermined angle within a predetermined range against a longitudinal direction of the antenna.

The foregoing object is also accomplished by a fourth embodiment of any one of the wireless tag units of the third embodiment, wherein the extended portion of the first conductive element includes a sub element capable of being detached from the first conductive element.

The foregoing object is also accomplished by a fifth embodiment of any one of the wireless tag units defined in the first-fourth embodiments, wherein the second conductive element is folded so that the folded portion of the second conductive element is opposed to the first conductive element, and wherein the folded portion of the second conductive element opposed to the first conductive element includes a sub element capable of being detached from the second conductive element.

DETAILED DESCRIPTION OF THE PREFERRED EMBODIMENT

First Example

Figure 1:
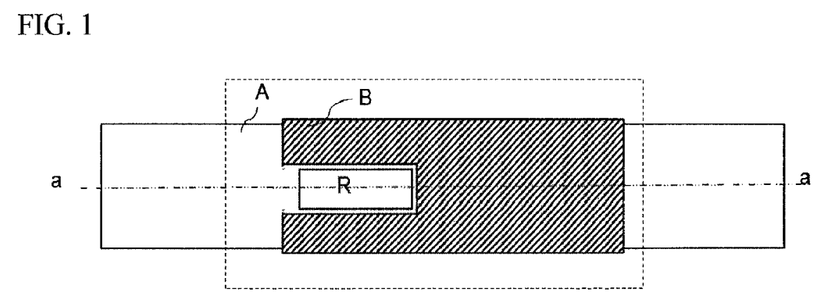
FIG. 1 illustrates a ground plan of a wireless tag unit of the first example.

FIG. 1 illustrates a ground plan of the wireless tag unit described as the third embodiment of the present invention. In FIG. 1, "A" represents the first conductive element. "B" represents the second conductive element. "R" represents a wireless tag. In FIG. 1, both edges of the first conductive element "A" are extended from the point where metal surface "M" is disposed toward the point where the first conductive element "A" coupled with the second conductive element "B". It will be called a coupling direction in this specification. Then, the extended portion of the first conductive element "A" can be set at a predetermined angle within a predetermined range against an incident angle of electro-magnetic (radio) waves incoming to the antenna. (Details will be explained later using FIGS. 2 and 3.)

Figure 2:
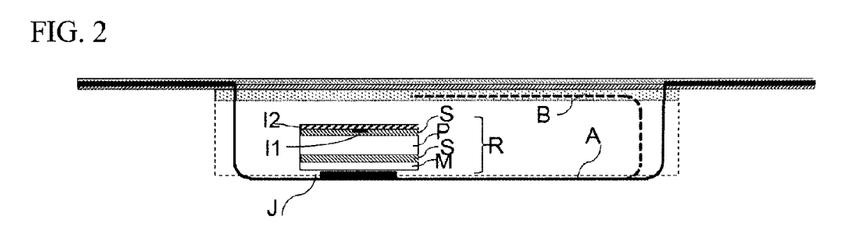
FIG. 2 illustrates a cross section of the wireless tag unit of the first example.
Figure 3:
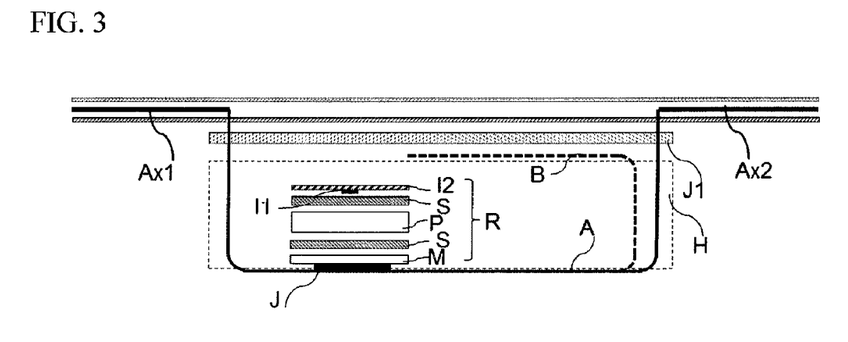
FIG. 3 illustrates a cross section exploded view of the wireless tag unit of the first example

FIG. 3 illustrates a cross section exploded view of the wireless tag unit shown in FIG. 2. In FIGS. 1-3, "A" represents the first conductive element, The first conductive element "A" is electro-magnetically coupled with a metal surface "M" through insulation bonding material "J", such as a double coated tape using polyester film.

Figure 8:
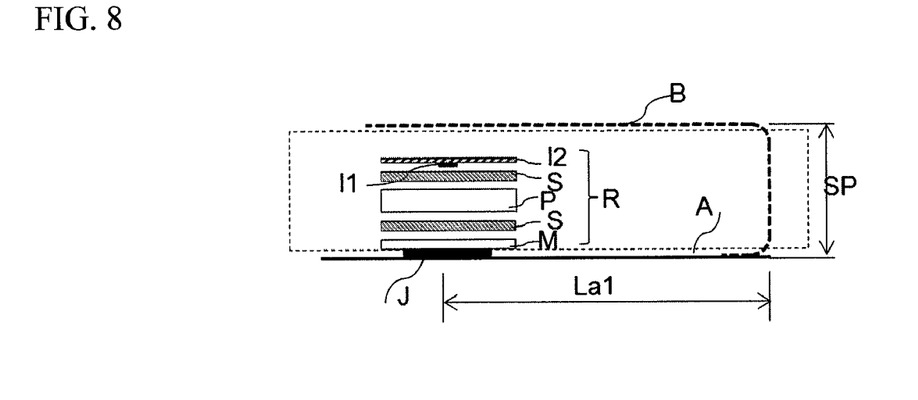
FIG. 8 illustrates a cross section exploded view of the second example.

Similarly, "B" represents the second conductive element, which is electro-magnetically coupled with the first conductive element "A" as illustrated in FIGS. 2-3. A part of the second conductive element "B" is structured above antenna "I2" of wireless tag "R" so as to keep a predetermined distance "SP" from the first conductive element "A" as shown in FIG. 8 (Details will be described later).

As illustrated in FIG. 3, "Ax1" and "Ax2" represent extended portions of the first conductive element "A" in both sides of the first conductive element "A" respectively, which are extended from the point where the wireless tag "R" is disposed toward the left and right directions (viewing from a viewer of FIG. 3 on the drawing paper).

Figure 4:
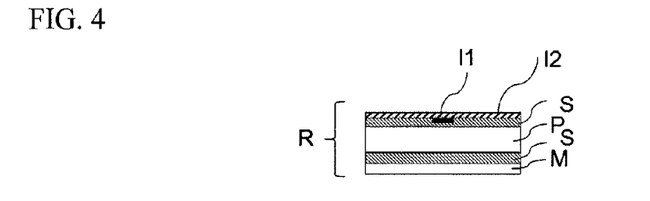
FIG. 4 illustrates a cross section of a wireless tag.
Figure 5:
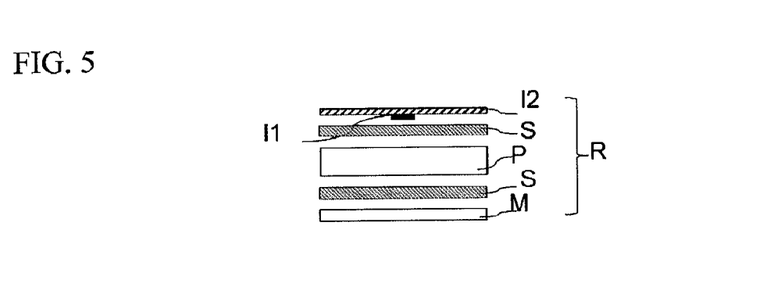
FIG. 5 illustrates an exploded view of the wireless tag.

Further, "H" represents an insulator having high impedance. Insulator "H" encloses the wireless tag "R". FIG. 4 illustrates a cross section of the wireless tag "R" in FIGS. 1-3. FIG. 5 illustrates an exploded view of the wireless tag "R" shown in FIG. 4.

FIG. 5 illustrates an explored view of wireless tug "R". As illustrated in FIG. 5, there is provided dielectric layer "P", on both side of which spacers "S" are laminated (here it is called a laminated body). Antenna element "I2" and communication/memory IC "I1" are laminated on one side of laminated body. Further metal surface "M" is laminated on the other side of the laminated body.

Figure 6:
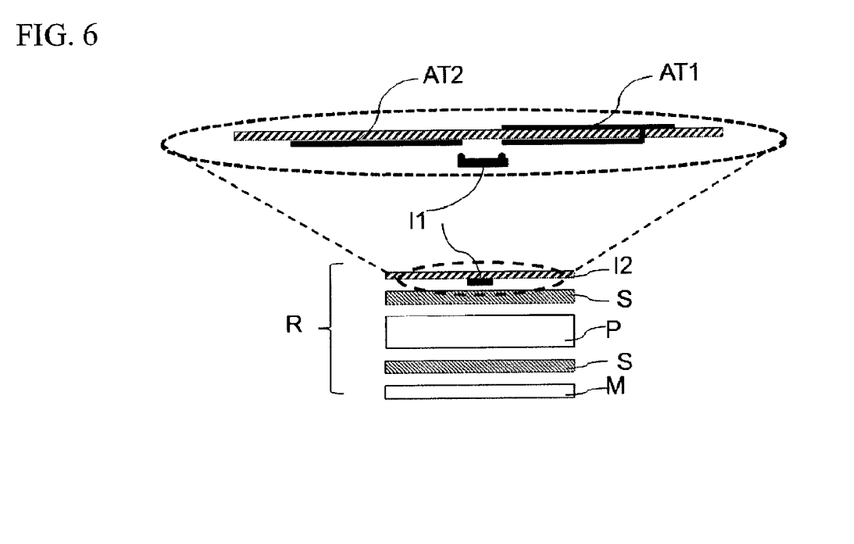
FIG. 6 illustrates an enlarged view of an antenna in the wireless tag.

FIG. 6 illustrates an enlarged view of antenna element "I2" and communication/memory IC "I1". Antenna "AT1" and another antenna "AT2" are connected to communication/memory IC "I1" as illustrated in FIG. 6.

According to the embodiments described above, first conductive element "A" and second conductive element "B" work to increase gain and directivity of radio waves being receive by or transmitted from the antenna "I2" installed on the communication/memory IC "I1" as directors for the antenna. Thus, it becomes possible to improve the read range characteristic (highly integrated and high sensitivity characteristics) of the wireless tag unit including the first conductive element "A" and the second conductive element "B" disclosed in this embodiment.

Second Example

Figure 7:
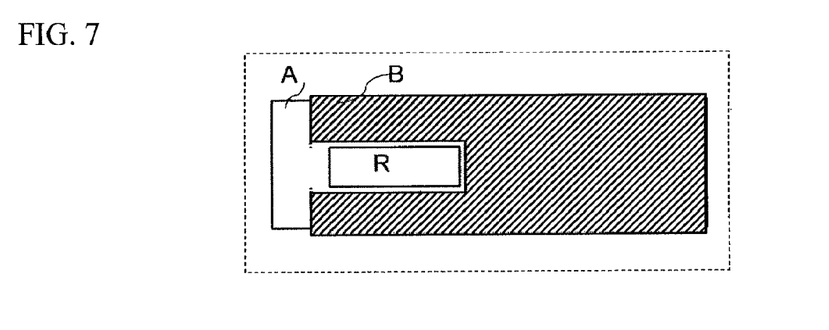
FIG. 7 illustrates a ground plan of the second example.

FIG. 7 and FIG. 8. illustrate a ground plan and a cross section of the wireless tag unit of the first embodiment having the first conductive element "A" and the second conductive element "B". In FIG. 7, "A" represents first conductive element, "B" represents second conductive element, and "R" represents the wireless tag.

In FIG. 8, "La1" represents the distance from substantially center of the metal surface "M" to a branched point of second conductive element "B" from first conductive element "A". Here, second conductive element "B" is electro-magnetically coupled with first conductive element "A". "SP" represents a predetermined distance between first conductive element "A" and a part of second conduction element "B" position above the antenna "I2" as illustrated in FIG. 8.

According to the embodiments described above, first conductive element "A" and second conductive element "B" work to increase gain and directivity of radio waves being receive by or transmitted from the antenna "I2" installed on the communication/memory IC "I1" as directors for the antenna. Thus, it becomes possible to improve the read range characteristic (highly integrated and high sensitivity characteristics) of the wireless tag unit including the first conductive element "A" and the second conductive element "B" disclosed in this embodiment.

Third Example

Figure 9:
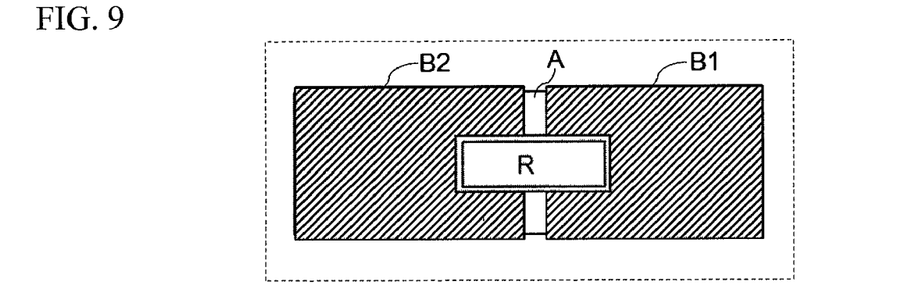
FIG. 9 illustrates a ground plan of the third example.
Figure 10:
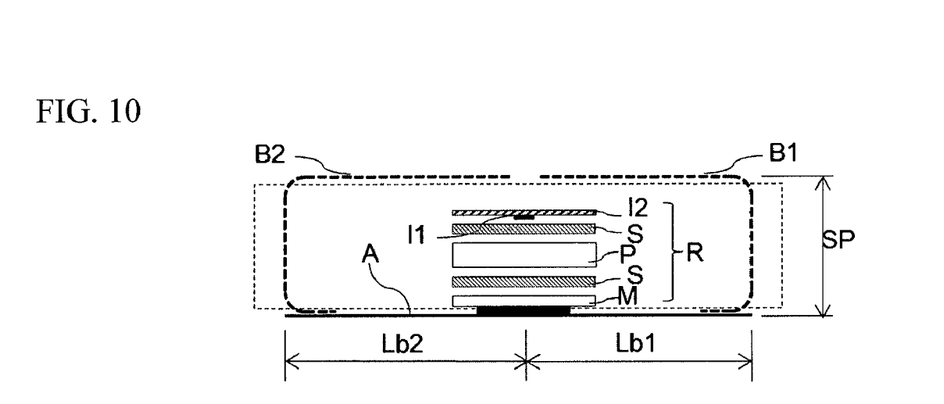
FIG. 10 illustrates a cross section exploded view of the third example.

FIG. 9 and FIG. 10 illustrate a ground plan and a cross section exploded view of a wireless tag unit of the second embodiment respectively.

In FIG. 9, second conductive element "B1 is electro-magnetically coupled with and branched from first conductive element "A" into one direction. First conductive element "A" is substantially symmetrically coupled with the substantially center of metal surface M" in the left and right direction (viewing from a viewer of drawing in FIG. 9 on the drawing paper). In the same way, "B2" represents another part of second conductive element electro-magnetically coupled with and branched from first conductive element "A" in the other direction.

In FIG. 10, "Lb1" represents the distance from substantially center of metal surface "M" to the coupling point where one of second conductive elements"B1" is coupled with and branched from first conductive element "A" which is extended into one direction from substantially center of metal surface "M". Here, the one of the second conductive element B1 is electro-magnetically coupled with and branched from the first conductive element "A".

In the same way, the "Lb2" represents the distance from substantially center of metal surface "M" to the coupling point of the other part of second conductive element "B2". Here, another part of second conductive element B2 is electro-magnetically coupled with and branched from first conductive element "A" as illustrated in FIG. 10.

According to the wireless tag unit disclosed in the embodiment described above, since first conductive element "A", and the second conductive elements "B1" and "B2" work to increase gain and directivity of radio waves being receive by or transmitted from the antenna "I2" installed on the communication/memory IC "I1" as directors for the antenna. Therefore, it becomes possible to improve the read range characteristic (highly integrated and high sensitivity characteristics) of the wireless tag unit used under the environment including non-conductive material and conductive material.

Fourth Example

Figure 11:
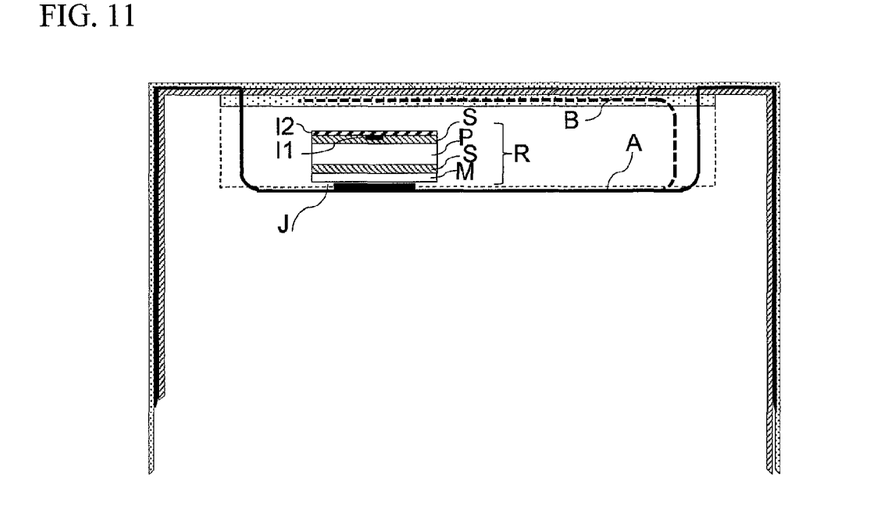
FIG. 11 illustrates a cross section of the fourth example.

FIG. 11 illustrates the cross section of a wireless tag unit of the third embodiment. As shown in FIG. 11, both sides of first conductive elements "A" are extended in left and right directions (seen from a viewer against the surface of the drawing in FIG. 11 on the drawing paper). The extended portions of first conductive element "A" are then folded twice so that the angle formed by the extended portions of first conductive element "A" and a portion of second conductive element "B" positioned above the antenna element "I2" is substantially 90 degrees as illustrated in FIG. 11.

As the usage of an arm wearable terminal such as an arm wristband, the length of second conductive element "B" (a horizontal portion disposed above the wireless tag "R" in FIG. 11) is set at 5 cm (50 mm) and the length of the extended portion of the first conductive element "A" (a vertical portion heading downward illustrated at the most left and right portions in FIG. 11) is set at 6 cm (60 mm) in this example, but not limited to. Further, the frequency of the radio wave used in RFID in this example is 920 MHz, which is UHF band. In this case, ¼ wavelengths and ½ wavelength of the frequency used by the RFID are 16.3 cm and 32.6 cm respectively.

According to the embodiment of the present invention, both sides of first conductive element "A" are extended in the coupling direction with the second conductive element "B" (coupling direction in this specification means that both sides of first conductive element "A" are extended from the point where the wireless tag "R" is disposed toward the left and right directions against the wireless tag "R" as illustrated in FIG. 11). And the extended portions of first conductive element "A" work to increase gain and directivity of radio waves being receive by or transmitted from the antenna "I2" installed on the communication/memory IC "I1" as directors for the antenna. As a result, the extended portions can be set at a wide angle against incoming radio wave transmitted from a reader/writer of the RFID. Thus, wide range directivity of the wireless tag unit used under environment including non-conductive material and conductive material can be attained.

Fifth Example

Figure 12:
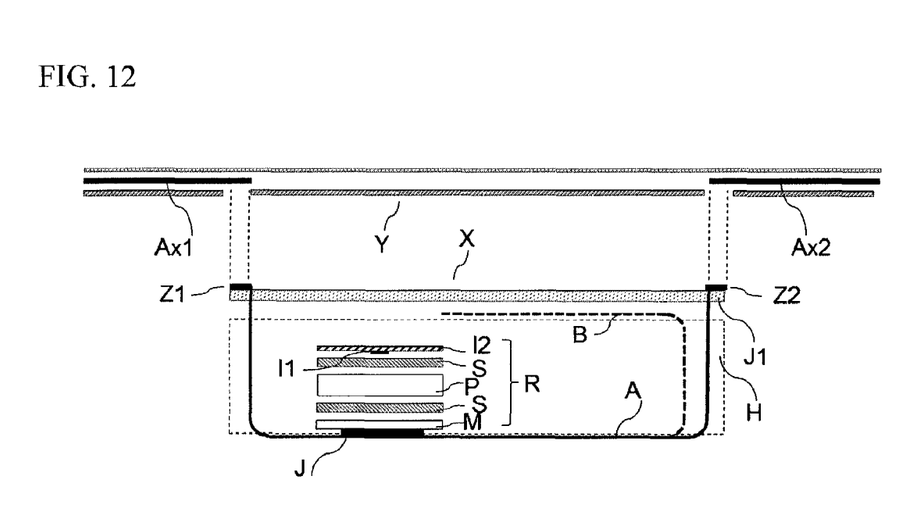
FIG. 12 illustrates a cross section of the fifth example.

FIG. 12 illustrates the cross section of wireless tag unit disclosed in the fourth embodiment of the present invention in which the extended portions "AX1" and "AX2" of first conductive element "A" include a sub element capable of being detached from the first conductive element "A".

Here, in FIG. 12, contact surfaces "Z1" and "Z2" of first conductive element "A" are electro-magnetically coupled with the extended portions "AX1" and AX2" of the first conductive element "A" respectively.

According to the fourth embodiment of the present invention, embodiment of the present invention, it becomes possible to provide wireless tag unit having capable of having a custom printing mark or items on the extended portion or to replace the extended portion with other replaced parts.

Sixth Example

Figure 13:
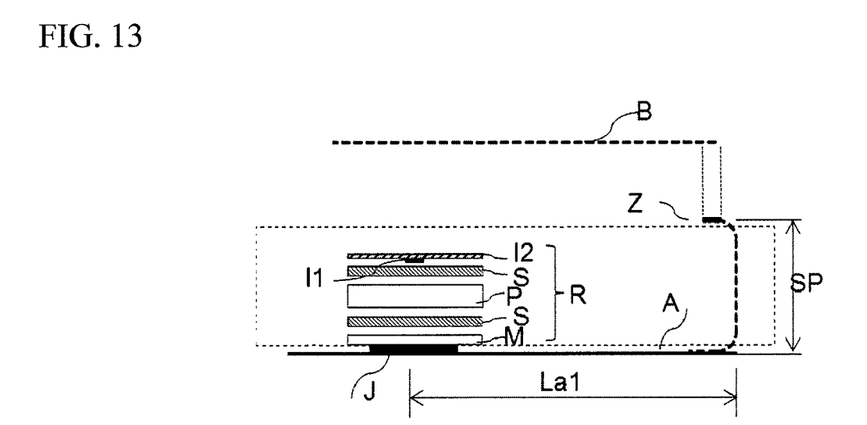
FIG. 13 illustrates a cross section of the sixth example.
Figure 14:
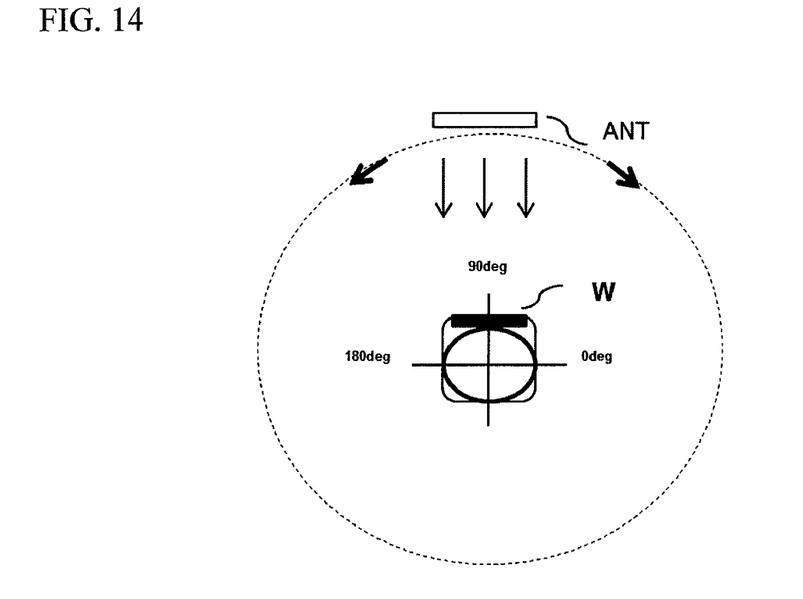
FIG. 14 illustrates a test method of directivity.

FIG. 13 illustrates the cross section of the wireless tag unit disclosed in the fifth embodiment in which a part of second conductive element "B" opposing to first conductive element "A" includes a sub element capable of being detached from second conductive element "B" as shown in FIG. 13. "Z" represents the bonding surface of the second conductive element "B".

According to the wireless tag unit disclosed in the fifth embodiment of the present invention, since second conductive element effectively contribute to improve the read range characteristics, by folding second conductive element around the wireless tag and further structuring that a part of second conductive element opposed to the first conductive element includes a sub element capable of being detached from the second conductive element, it becomes possible to produce the wireless tag units according to each of the read range characteristics.

TABLE 1

Test results of the wireless tag unit of the first embodiment will be shown in TABLE1 below.
The read range effect on the wireless tag unit of the first embodiment (Input 30 dBm)

| Environment | Condition | Read range |
| --- | --- | --- |
| Non-conductive material | Only first conductive element | 2.5 m |
| | First conductive element + Second conductive element | 5.0 m |
| Conductive material | Only first conductive element | 1.0 m |
| | First conductive element + Second conductive element | 3.0 m |

Reference data: When a single wireless tag is tested under the same measurement condition, the read ranges are as followings: Under environment including non-conductive material: 0.2 m, and under environment including conductive material: 0.3 m, which indicated that the read ranges of the wireless tag according to the first embodiment of the present invention have been improved.

TABLE 2

Test results of the wireless tag unit of the second embodiment will be shown in TABLE 2 below.
The read range effect on the wireless tag unit of the second embodiment (Input 30 dBm)

| Environment | Conditions | Read ranges |
| --- | --- | --- |
| 1. Non-Conductive material | Only first conductive element | 1.0 m |
| | First conductive element + Second conductive element | 2.5 m |
| | First conductive element + Second conductive element + Third conductive element | 5.0 m |
| 2. Conductive material | Only first conductive element | 0.6 m |
| | First conductive element + Second conductive element | 2.2 m |
| | First conductive element + Second conductive element + Third conductive element | 3.0 m |

TABLE 3

Test results of the wireless tag unit of the fourth example will be described in TABLE 3 below.
Wide range directivity effects of the third embodiment,
Wireless tag unit surface is bended at 90 degrees. (Input 30 dBm)

| | Antenna angle | | | | | | | |
| --- | --- | --- | --- | --- | --- | --- | --- | --- |
| | 0° | 45° | 90° | 135° | 180° | 225° | 270° | 315° |
| Directivity | 81.8% | 90.9% | 100% | 90.9% | 54.5% | 27.3% | 27.3% | 27.3% |

EXPLANATION OF SYMBOLS IN THE DRAWINGS

A: First conductive element B: Second conductive element R: Wireless tag I1: IC having communication/memory functions
I2: Antenna S: Spacer layer P: Dielectric layer, M: Metal surface
H: Insulator J: Bonding material (adhesion material+ Insulator Film+adhesion material) J1: Bonding material 1
Ax1: Extended portion of First conductive element
Ax2: Another extended portion of First conductive element
AT1: Antenna AT2: Antenna La1: Distance between center of Metal surface and Second conductive element
SP: Distance between First conductive element and Second conductive element B1: Second conductive element B2: Second conductive element Lb1: Distance between Metal surface and Second conductive element Lb2: Distance between Metal surface and Second conductive element Y: Separation unit Z1: Bonding surface of First conductive element (Ax1) Z2: Bonding surface of First conductive element (Ax2), Z: Bonding surface of second conductive element
ANT: Testing antenna W: Wireless tag unit.

What is claimed is:
1. A wireless tag unit containing an antenna connected to a semiconductor element including communication and memory functions, a dielectric layer and a metal layer structured to be opposed with the antenna via the dielectric layer, the wireless tag unit comprising:
a first conductive element electro-magnetically coupled with a metal surface of the metal layer; and
a second conductive element electro-magnetically coupled with the first conductive element, the second conductive element being structured to be branched from the first conductive element, wherein a part of the second conductive element is structured above the antenna so as to keep a predetermined distance from the first conductive element, an open structure being provided with said a part of the second conductive element not to fully shield an area above the antenna,
wherein both edges of the first conductive element are extended in a coupling direction with the second conductive element so that the extended portion is set at a predetermined angle within a predetermined range against a longitudinal direction of the antenna, and,
wherein the extended portion of the first conductive element includes a sub element capable of being detached from the first conductive element.
2. A wireless tag unit containing an antenna connected to a semiconductor element including communication and memory functions, a dielectric layer and a metal layer structured to be opposed with the antenna via the dielectric layer, the wireless tag unit comprising:
  a first conductive element electro-magnetically coupled with a metal surface of the metal layer; and
  a second conductive element electro-magnetically coupled with the first conductive element, the second conductive element being structured to be branched from the first conductive element, wherein a part of the second conductive element is structured above the antenna so as to keep a predetermined distance from the first conductive element, an open structure being provided with said a part of the second conductive element not to fully shield an area above the antenna,
wherein the second conductive element is folded so that the folded portion of the second conductive element is opposed to the first conductive element, and
wherein the folded portion of the second conductive element opposed to the first conductive element includes a sub element capable of being detached from the second conductive element.

3. A wireless tag unit containing an antenna connected to a semiconductor element including communication and memory functions, a dielectric layer and a metal layer structured to be opposed with the antenna via the dielectric layer, the wireless tag unit comprising:
  a first conductive element electro-magnetically coupled with a metal surface of the metal layer; and
  a second conductive element electro-magnetically coupled with the first conductive element, the second conductive element being structured to be branched from the first conductive element, wherein a part of the second conductive element is structured above the antenna so as to keep a predetermined distance from the first conductive element, an open structure being provided with said a part of the second conductive element not to fully shield an area above the antenna,
wherein the second conductive element is structured by a plurality of conductive parts, each of the conductive parts being electro-magnetically coupled with and branched from the first conductive element, and
wherein each of the conductive parts is substantially symmetrically installed on a substantially center of the semiconductor element connected to the antenna.

4. The wireless tag unit of claim 3,
wherein both edges of the first conductive element are extended in a coupling direction with the second conductive element so that the extended portion is set at a predetermined angle within a predetermined range against a longitudinal direction of the antenna.

* * * * *